(12) United States Patent
Koyama et al.

(10) Patent No.: US 6,590,722 B1
(45) Date of Patent: Jul. 8, 2003

(54) OPTICAL ELEMENT

(75) Inventors: Tadashi Koyama, Osaka (JP); Hiroaki Yamamoto, Osaka (JP); Koichiro Nakamura, Osaka (JP); Jun Yamaguchi, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 36 days.

(21) Appl. No.: 09/709,557

(22) Filed: Nov. 13, 2000

(30) Foreign Application Priority Data

Nov. 11, 1999 (JP) .......................... 11-321057
Feb. 8, 2000 (JP) ...................... 2000-030837

(51) Int. Cl.⁷ ............................... G02B 7/02
(52) U.S. Cl. ...................... 359/820; 351/819
(58) Field of Search ............... 359/820, 131, 359/819; 385/123, 131

(56) References Cited

U.S. PATENT DOCUMENTS

| | | | | |
|---|---|---|---|---|
| 4,872,743 A | * | 10/1989 | Baba et al. | 359/298 |
| 4,898,755 A | * | 2/1990 | Che et al. | 252/299.01 |
| 5,111,467 A | * | 5/1992 | Bradley | 372/32 |
| 5,930,441 A | * | 7/1999 | Betts et al. | 385/140 |
| 6,055,349 A | * | 4/2000 | Seino et al. | 385/50 |
| 6,246,809 B1 | * | 6/2001 | Juanno et al. | 385/22 |
| 6,304,687 B1 | * | 10/2001 | Inoue et al. | 385/14 |

FOREIGN PATENT DOCUMENTS

| | | |
|---|---|---|
| DE | 41 30 550 A1 | 3/1993 |
| EP | 0 287 093 A2 | 10/1988 |
| JP | A-8-157735 | 6/1996 |
| JP | 10-221719 | 8/1998 |

OTHER PUBLICATIONS

Friberg S. E. et al., "A Poly(methyl methacrylate)/silica combination material" Journal of Materials Science Letters, Chapman and Hall Ltd., London, GB, vol. 20, No. 11, Oct. 1992, pp. 1373–1375 XP001068843.
Patent Abstracts of Japan, vol. 016, No. 309, Jul. 8, 1992 & JP 04 086668 A, Mar. 19, 1992.
Patent Abstracts of Japan, vol. 011, No. 298, Sep. 26, 1987 & JP 60 089936 A, Apr. 24, 1987.
Patent Abstracts of Japan (JP-A-8-157335).

* cited by examiner

*Primary Examiner*—Hung Xuan Dang
(74) *Attorney, Agent, or Firm*—Sughrue Mion, PLLC

(57) ABSTRACT

An optical element comprises a solid material in an optical path of the optical element, wherein the solid material comprises a first material and a second material, and the first and second materials have first and second temperature coefficients of refractive index, respectively, wherein the first temperature coefficient of refractive index has a sign which is opposite that of the second temperature coefficient of refractive index.

9 Claims, 8 Drawing Sheets

OPTICAL ELEMENT

FIELD OF THE INVENTION

This invention relates to a material constituting an optical element used in the fields of optical communication, optical measurement and laser engineering.

DESCRIPTION OF RELATED ART

Recent years have seen remarkable development of optical technology with the advanced optical communications systems and advanced lasers. The demands for precision and performance of optical elements used in these fields have been increasing accordingly. Glass is one of the most important materials of optical components such as optical fibers and optical lenses. Glass can have a wide variety of compositions which can be selected in conformity with the application. Glass for such use is required to have stability as well as optical transparency. While glass is usually relatively excellent in weather resistance and heat resistance, some compositions have poor water resistance or insufficient thermal properties for particular applications.

Included in characteristics required of optical materials is stability against temperature. Stability against temperature means unchangeability of the characteristics with temperature changes. That is, heat-resistant glass does not always have stable characteristics against change in temperature.

When temperature changes, an optical material changes in not only refractive index but length, and the two changes cooperatively result in a change of optical path length. According to Izumiya Tetsuro, *Kogaku Glass (Optical Glass)*, Kyoritsu Syuppan (1984), the relationship between thermal expansion coefficient $\alpha_a$ and temperature T dependence of refractive index $n_a$ is established by equation (1) with the optical path length of the space that changes with thermal expansion being taken into consideration:

$$dn_a/dT + (n_a 1-)\alpha_a = 0 \qquad (1)$$

Where a material having instable optical characteristics against temperature is used as an optical element, for example, a medium of a laser, the beam mode would change. Where applied to a prism for optical path length control in an interferometer, the optical path length would be changed delicately. According to *Kogaku Glass*, the temperature coefficient of optical path length s, ds/dT, is $6 \times 10^{-6}/°$ C. in the case of LSG91H glass. Such a temperature-dependent change in optical path length causes considerable instability particularly in an interferometer. A material called athermal glass has been developed to eliminate the above-described drawback, whose optical path length change with temperature is near to zero.

Since it is necessary to select constituting components for athermal glass so as to satisfy equation (1), athermal glass eventually contains increased amounts of phosphoric acid, boric acid, and the like and therefore has poor water resistance, which is problematical for broad applications. Further, the composition being limited, it is difficult to control the physical properties characteristic of glass, such as refractive index.

Furthermore, optical elements have recently shown marked development in function with the development of optical communication. In particular, an optical wavelength division multiplex (WDM) communications system has gained in importance to cope with the growing demand for communication capacity. Unlike a conventional single-channel optical communications system which transmits one wavelength, e.g., 1550 nm, per optical fiber, the WDM system transmits different wavelengths simultaneously to increase the transmission capacity. An 8-channel system and a 16-channel system having the peak wavelengths equally spaced by 1.6 nm or 0.8 nm, respectively, have been put into practical use. There is a tendency that the number of channels increases, i.e., the spacing between wavelengths decreases. In the WDM system, such functions as combining (multiplexing) optical signals of different wavelengths or dividing (demultiplexing) optical signals into different wavelengths are of importance. For dividing wavelengths, the diffraction effect or interference effect of light has been utilized.

An optical fiber Bragg grating is a representative element for wavelength division. As shown in FIG. 4, an optical fiber having a clad layer 14 and a core 13 containing $SiO_2$ and $GeO_2$ is irradiated with ultraviolet light 15 having a periodic intensity distribution (e.g., an excimer laser beam having a wavelength of 248 nm) to form high-refractive index portions 19 and low-refractive index portions periodically in the core 13, which function as an optical fiber Bragg grating 11. A periodic light intensity distribution can be developed by a phase mask 16, etc., and diffracted light beams 17 and 18 are made to interfere with each other. The optical fiber Bragg grating 11 takes an important role in the WDM communications system as a demultiplexing element, serving to reflect and isolate only a desired wavelength.

Such a Bragg grating can be formed in not only an optical fiber but a flat member, such as a photosensitive polymer film, etc. by periodically forming high-refractive index portions and low-refractive index portions, which can be applied as a demultiplexing element or filter.

Further, systems utilizing the interference effect of light beams passing through two-split optical paths are also used in optical communication technology, such as a Mach-Zehnder interference element of optical fiber type as described in *J. Lightwave Technology*, vol. 16, p. 265 (1998) and a Mach-Zehnder interference element of optical waveguide type as described in ibid, vol. 17, p. 771 (1999).

These optical elements change in refractive index and physical length with temperature changes. These two changes cooperatively result in a change of optical length, which will cause, for example, the above-described optical fiber Bragg diffraction grating to shift its reflection wavelength from a set value. For instance, *J. Lightwave Technology*, vol. 14, p. 58 (1996) reports that the wavelength shift in a silica optical fiber due to temperature change is about 0.01 nm/° C. That is, if temperature changes from $-20°$ C. to $80°$ C., the reflection wavelength is shifted to the longer wavelength side by about 1 nm. Such a shift width exceeds the wavelength spacing in the above-mentioned WDM communications system, which is a serious problem making the system unworkable. The optical fiber Bragg diffraction grating is a single example, and a similar problem arises in other optical elements.

SUMMARY OF THE INVENTION

An object of the invention is to provide an optical element which shows suppressed change in optical length with a temperature change and is therefore applicable to a variety of optical systems including optical WDM communication.

The above-described problems are solved by making up the optical path material of an optical element of a mixture or a composite of a first material and a second material, the temperature coefficients of refractive index of the first and second materials having opposite signs. (That is, if the temperature coefficient of refractive index of the first material is positive, that of the second material is negative, and vice versa.) The material includes a mixture or a composite of an organic material and an inorganic material.

In the present invention, the optical element may comprise a solid material and a space comprising one of air and vacuum in the optical path thereof (a first embodiment), or may consist essentially of solid (a second embodiment). In the second embodiment, for example, the function of reflecting a light having a specific wavelength selectively is completed in the inside of the element (e.g., waveguide type diffraction grating). In the first embodiment, the optical element may be used for a medium for a laser, a lens, a prism or a beam splitter. In the second embodiment, the optical element may be used for a diffraction grating (waveguide type), an interference filter, a photonic crystal, an etalon or an optical waveguide.

Figure 1:
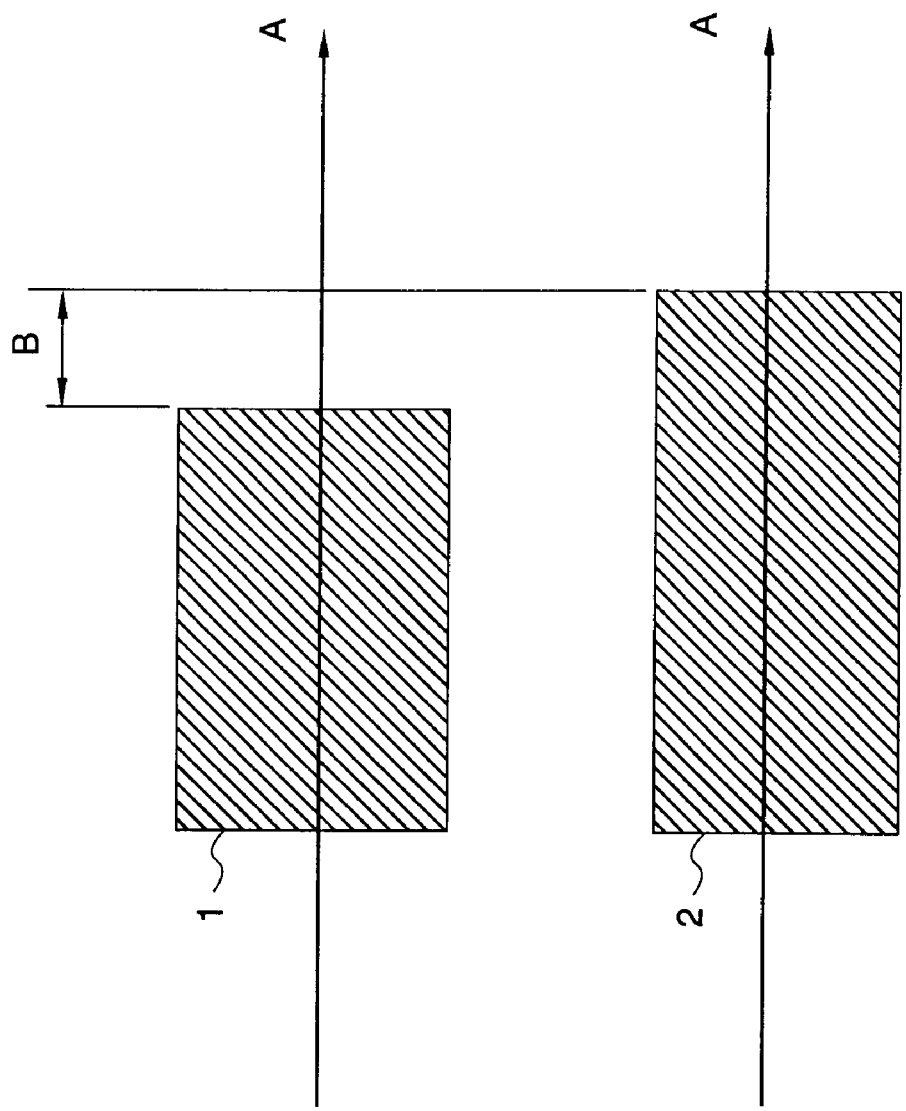
FIG. 1 is a diagram for explaining an optical path length and an optical path length change with temperature.

1 . . . optical medium
2 . . . optical medium at an elevated temperature
A . . . optical path
B . . . otical path length of space
3 . . . mirror
4 . . . mirror
5 . . . half mirror
6 . . . test sample
7 . . . optical detector
10 . . . incident light
11 . . . optical fiber Bragg grating
12 . . . optical fiber
13 . . . core
14 . . . clad layer
15 . . . irradiating light
16 . . . phase mask
17, 18 . . . diffracted light by phase mask
19 . . . area having the refractive index changed by irradiation
20 . . . laser
22, 26, 28 . . . mirror
24 . . . beam splitter
30 . . . sample
42, 43, 44, 45, 46 . . . beam 50 . . . substrate
52 . . . thin film
54 . . . diffraction grating
56 . . . slab waveguide

DETAILED DESCRIPTION OF THE INVENTION

The term "mixture" as used herein means a combination of an organic compound and an inorganic compound obtained by mere stirring.

The term "composite" as used herein is intended to mean a combination of an organic component and an inorganic component which are chemically bonded to each other through, for example, a covalent bond or a coordination bond.

In the first embodiment, the proportion (molor fraction) of the organic material in the mixture or the composite is preferably 2 to 10 mol %.

In the second embodiment, the proportion (molor fraction) of the organic material in the mixture or the composite is preferably about 15 mol % to 25 mol %.

The term "molar fraction" as used in the present invention denotes a ratio of the number of atoms constituting an organic component or an inorganic component, the organic component and the inorganic component being defined as follows.

The concentration of the inorganic component is defined by the number of metal elements (e.g., Si, Ti, Zr, Al, Zn, In, Sn, etc.) and oxygen atoms bonded thereto The concentration of the organic component is defined by the number of other elements than above (e.g., C, H, Ci, F, Br, I, O, etc.)

In the present invention, components that are present in compounding but decompose or volatilize are not counted. Those which remain in the final material are counted in. For example, ethanol used as a solvent and $C_2H_5OH$ generated on hydrolysis of $Si$—$OC_2H_5$ do not count if they volatilize.

In the present invention, organic components present in inorganic compounds are counted among organic components. For example, the $CH_3$ group in $CH_3$—$Si$, the Ph (phenyl) group in Ph—Si, and the $CH_2$=$CH$ group in $CH_2$=$CH$—$Si$ are all counted as organic components.

In the present invention, the raw materials of organic compounds include all carbon compounds except carbon oxide and metal carbonates, e.g., compounds having a hydrocarbon groups and photopolymerizable monomers having a polymerizable group, such as a vinyl group, an acrylic group, a methacrylic group, and an allyl group. The raw materials of inorganic compounds include metal alkoxides, metal halides, and metal complexes. Raw materials of the composite of an organic component and an inorganic component, such as vinylsilane, acrylsilane, and methacrylsilane, are also used.

The organic material for use in the present invention includes those mainly comprising a hydrocarbon and/or a hydrocarbon derivative. The inorganic material for use in the present invention includes glass materials comprising at least one of $SiO_2$, $TiO_2$, $GeO_2$, $Al_2O_3$, $ZrO_2$, $B_2O_3$, $Na_2O$, MgO, and CaO.

In the present invention, the starting material for a material constituting the composite is preferably organic/inorganic composite. When a specific organic compound and an inorganic compound are mixed, there is a problem that the compatibility is bad, and phase separation or whitening is occurred. For example, an organic compound not containing a functional group (e.g., amide bond, imide bond, urethane bond) that is easy to bond with a hydroxyl group like silanol group, which generates during a forming process of an inorganic compound is the case. Accordingly, compatibility is improved when an organic/inorganic composite where an organic compound and an inorganic compound are bonded to each other as a starting material.

The optical element of the present invention is preferably produced by a process including a heat treatment at 150° C. or higher. Such a heat treatment at a temperature of 150° C. or higher can valtalize an organic solvent or water added as a catalyst during production process so as to prevent the organic solvent and water from remaining in the material. Accordingly, this heat treatment can suppress material shrinkage caused by the volatilization of the organic solvent and water after element formation, and reduce temperature change of optical element.

In the first embodiment, lenses, prisms and media for lasers for some applications can be made of plastics, but most of such optical components are constituted of inorganic materials, typically glass. Changes in optical characteristics with a temperature change are attributed to a term in which a change in refractive index with a temperature change leads to a change in optical path length and a term in which the optical path length physically changes due to thermal expansion. Taking for instance light passing through a simple rectangular parallelopiped optical medium 1 depicted in FIG. 1, the optical path length S is defined by equation (2):

$$S = nL \quad (2)$$

wherein n is the refractive index of the medium; and L is the total length of the medium. In FIG. 1, A denotes an optical pass, and B denotes a spatial optical path length.

When temperature changes by $\Delta T°$ C., the optical path length changes as shown by an optical medium 2. The optical medium 2 has a refractive index of (n+(dn/dT)·$\Delta T$), and a length of (L+$\alpha L\Delta T$). The optical path length of the optical medium 2 (after the change) is represented by equation (3):

$$S+(dS/dT)L\Delta T = (n+(dn/dT)\Delta T)(L+\alpha L\Delta T) - 1\cdot 60 \ L\Delta T = nL + (dn/dT)\Delta TL + n\alpha L\Delta T + (dn/dT)\Delta T\alpha L\Delta T) - 1\cdot \alpha L\Delta T \quad (3)$$

wherein dn/dT is a temperature coefficient of refractive index; dS/dT is a temperature coefficient of optical path length; and $\alpha$ is a coefficient of linear expansion. Since all the coefficients are on the order of $10^{-6}$, the fourth term of the right-hand side of equation (3) may be ignored. The last term is one compensating for the spatial optical path length changing B with the expansion of the optical element.

The change in optical path length with a temperature change ($\Delta T$) is developed as follows:

$$(dS/dT)L\Delta T = (dn/dT)\Delta TL + n\alpha L\Delta T - 1\cdot \alpha L\Delta T$$

from which equation (4) for the optical path length temperature coefficient, dS/dT, is led:

$$dS/dT = (dn/dT) + (n-1)\alpha T \quad (4)$$

Accordingly, in order to make the optical path length difference zero, equation (5) must be satisfied.

$$(dn/dT) + (n-1)\alpha = 0 \quad (5)$$

Because $\alpha$ is usually a positive number, and n of a solid material is greater than 1, the term dn/dT must be negative to satisfy equation (5). While many glass materials have a positive dn/dT value, many organic compounds have a negative dn/dT value to make the left term of equation (5) negative.

It is therefore expected that use of a mixture of an organic compound and an inorganic compound eliminates the temperature dependence of an optical path length. The present invention aims at solving the outstanding problem by using a mixture or a composite of an organic material and an inorganic material as a basic material constituting an optical element. A method for deciding a theoretically optimum value for the ratio of an organic material and an inorganic material will be described below.

(1) The refractive index of an organic material alone and an inorganic material alone ($n_p$ and $n_i$, respectively), the refractive index temperature coefficient of the organic material alone and the inorganic material alone ($dn_p/dT$ and $dn_i/dT$, respectively), and the linear expansion coefficient of the organic material alone and the inorganic material alone ($\alpha_p$ and $\alpha_i$, respectively) are measured.

(2) The measurements are applied to equation (6) derived from the Lorentz-Lorenz equation to obtain the temperature coefficient of electron polarization of the organic material and the inorganic material ($\phi_p$ and $\phi_i$, respectively)

$$dn_m/dT = [\{(n_m^2-1)(n_m^2+1)\}/6n_m](\phi_m - 3\alpha_m) \quad (6)$$

wherein m=p as for the organic material, and m=i as for the inorganic material.

(3) The refractive index $n_c$, refractive index temperature coefficient $n_c/dT$, and linear expansion coefficient $\alpha_c$ of a mixture or a composite of the organic material and the inorganic material are obtained through equations (7) to (12) by the method of successive approximation (iterative method) in which the molar fraction of the inorganic material in the mixture or the composite is taken as a variable x, thereby to decide the molar fraction x of the inorganic material constituting an optical element which satisfies equation (5).

$$n_c^2 = (V_c + 2R_c)/(V_c - R_c) \quad (7)$$

$$V_c = V_i x + V_p (1-x) \quad (8)$$

$$R_c = R_i x + R_p (1-x) \quad (9)$$

$$\alpha_c = [\alpha_i \cdot V_i x/\{V_p(1-x) + V_i x\}] + [\alpha_p \cdot V_p(1-x)/[V_p(1-x) + V_i x\}] \quad (10)$$

$$\phi_c = [\phi_i \cdot V_i x/\{V_p(1-x) + V_i x\}] + [\phi_p \cdot V_p(1-x)/\{V_p(1-x) + V_i x\}] \quad (11)$$

$$dn_c/dT = [\{(n_c^2-1)(n_c^2+1)\}/6n_c](\phi_c - 3\alpha_c) \quad (12)$$

wherein $\phi_c$ is an electron polarization temperature coefficient of the material constituting the optical element; $V_c$ is a molar volume of the material constituting the optical element; $V_p$ is a molar volume of the organic material alone; $V_i$ is a molar volume of the inorganic material alone; $R_c$ is a molecular refraction of the material constituting the optical element; $R_p$ is a molecular refraction of the organic material alone; and $R_i$ is a molecular refraction of the inorganic material alone.

The molar fraction x thus decided serves as a measure in actual compounding of materials as demonstrated in Example 1 hereinafter given.

In the second embodiment, Optical elements making use of interference or diffraction of light could be made of plastics for some applications, but most of them are constituted of inorganic materials such as glass. Changes in optical characteristics with a temperature change are attributed to a term in which a change in refractive index with temperature leads to a change in optical path length and a term in which the optical path length physically changes due to thermal expansion. Taking an optical fiber Bragg diffraction grating for instance, the reflection wavelength is represented by equation (1'):

$$\lambda_s = 2n\Lambda \tag{1'}$$

wherein $\lambda_s$ is a center wavelength; n is an effective refractive index of a propagation mode; and $\Lambda$ is the period of a diffraction grating.

When temperature changes by $\Delta T°$ C., the center wavelength changes as represented by equation (2'):

$$\lambda_{BT} = 2(n+(dn/dT)\Delta T)\cdot(\Lambda+\alpha\Lambda\Delta T)) = 2(n\Lambda+(dn/dT)\Delta T\Lambda+n\alpha\Lambda\Delta T+(dn/dT)\Delta T\alpha\Lambda\Delta T) \tag{2'}$$

wherein dn/dT is a temperature coefficient of refractive index; and $\alpha$ is a coefficient of linear expansion. Since both the coefficients are on the order of $10^{-6}$, the last term of equation (2') may be ignored. The wavelength shift $\Delta\lambda$ of the optical fiber diffraction grating due to the temperature change ($\Delta T$) is represented by equation (3'):

$$\Delta\lambda = 2\{(dn/dT)+n\alpha\}\Delta T\Lambda \tag{3'}$$

It is easily understood that the value in the braces of the right-hand side of equation (3') must be zero in order to make the wavelength shift zero. That is, equation (4') must be satisfied.

$$(dn/dT)+n\alpha = 0 \tag{4'}$$

Because n and $\alpha$ are usually positive numbers, the term dn/dT must be negative to satisfy equation (4'). This condition also applies to etalons, interference waveguides, and like optical elements. Many glass materials except special ones have a positive refractive index temperature coefficient dn/dT, and $n\alpha$ is a positive value greater than that. It is difficult therefore to make the left-hand side of equation (4') zero. On the other than, as taught in *Kino Zairyo* (*functional Material*), No. 10, p. 5 (1998), many organic compounds have a negative dn/dT which can make the first term of the left-hand side of equation (4') negative.

Thus, combination of an organic compound and an inorganic compound eliminates the temperature dependence. The present invention aims at solving the outstanding problem by using a mixture or a composite of an organic material and an inorganic material as a basic material constituting an optical element. A method for deciding a theoretically optimum value for the compositional ratio of the organic material and the inorganic material will be described below.

(1) The refractive index of an organic material alone and an inorganic material alone ($n_p$ and $n_i$, respectively), the refractive index temperature coefficient of the organic material alone and the inorganic material alone ($dn_p/dT$ and $dn_i/dT$, respectively), and the linear expansion coefficient of the organic material alone and the inorganic material alone ($\alpha_p$ and $\alpha_i$, respectively) are measured.

(2) The measurements are applied to equation (5) derived from the Lorentz-Lorenz equation to obtain the temperature coefficient of electron polarization of the organic material and the inorganic material ($\phi_p$ and $\phi_i$, respectively).

$$dn_m/dT = [\{(n_m^2-1)(n_m^2+1)\}/6n_m](\phi_m - 3\alpha_m) \tag{5'}$$

wherein m=p as for the organic material, and m=i as for the inorganic material.

(3) The refractive index $n_c$, refractive index temperature coefficient $n_c/dT$, and linear expansion coefficient $\alpha_c$ of a mixture or a composite of the organic material and the inorganic material are obtained through equations (6') to (11') by the method of successive approximation (iterative method) in which the molar fraction of the inorganic material in the mixture or the composite is taken as a variable x, thereby to decide the molar fraction x of the inorganic material constituting an optical element which satisfies equation (4').

$$n_c^2 = (V_c + 2R_c)/(V_c - R_c) \tag{6'}$$

$$V_c = V_i x + V_p(1-x) \tag{7'}$$

$$R_c = R_i x + R_p(1-x) \tag{8'}$$

$$\alpha_c = [\alpha_i \cdot V_i x/\{V_p(1-x)+V_i x\}] + [\alpha_p \cdot V_p(1-x)/[V_p(1-x)+V_i x]] \tag{9'}$$

$$\phi_c = [\phi_i \cdot V_i x/\{V_p(1-x)+V_i x\}] + [\phi_p \cdot V_p(1-x)/\{V_p(1-x)+V_i x\}] \tag{10'}$$

$$dn_c/dT = [\{(n_c^2-1)(n_c^2+1)\}/6n_c](\phi_c - 3\alpha_c) \tag{11'}$$

wherein $\phi_c$ is an electron polarization temperature coefficient of the material constituting the optical element; $V_c$ is a molar volume of the material constituting the optical element; $V_p$ is a molar volume of the organic material alone; $V_i$ is a molar volume of the inorganic material alone; $R_c$ is a molecular refraction of the material constituting the optical element; $R_p$ is a molecular refraction of the organic material alone; and $R_i$ is a molecular refraction of the inorganic material alone.

EXAMPLE 1

Materials including $SiO_2$ as an inorganic material and a photopolymerizable monomer as an organic material were prepared. The use of a photopolymerizable monomer is not so important. It was chosen for the sake of ease of material preparation. A reaction based chiefly on a sol-gel process was utilized for obtaining a uniform mixture of these materials. The starting materials were tetraethoxysilane (hereinafter abbreviated as TEOS) which supplies $SiO_2$ having a refractive index of about 1.42 and 2-hydroxy-3-phenoxypropyl acrylate ($CH_2$=$CHCOOCH_2C(OH)HCHO$—$C_6H_5$, hereinafter abbreviated as HFPA) which photopolymerizes to give a polymer having a refractive index of about 1.55. The ratio of the organic component and the inorganic component was obtained from the weight ratio of $SiO_2$ (after hydrolysis of TEOS) and HFPA. In Example 1, the molar ratio of the inorganic component was varied from 0% to approximately 100% to examine the effect.

A mixture consisting of 90 g of TEOS, 20 cc of tetrahydrofuran, 100 cc of isopropyl alcohol, 15.6 cc of water, and 7.2 cc of hydrogen chloride was allowed to react at 80° C. for 30 minutes to prepare a TEOS reaction mixture which was the base of the inorganic material.

A prescribed amount of HFPA was added to the reaction mixture. Then 3,3',4,4'-tetra(t-butylperoxycarbonyl) benzophenone (BTTB, available from Nippon Oil & Fats Co., Ltd.) as a photopolymerization initiator and 3,3-carbonylbis (7-diethylaminocoumarin) (ketocoumarin dye) as a visible light photosensitizer were mixed therein in amounts of 10% by weight and 0.5% by weight, respectively, based on the solid content. The reaction mixture was cast on a support and dried to obtain a cast film having a thickness of about 100 to 200 $\mu$m. When the proportion of the organic component is small, the cast film was so easily broken that it was dried slowly over a period of about 1 week, and a casting support coated with an inert material, such as gold, was used for preventing adhesion to the casting material. The cast film was uniformly irradiated with light of 514.5 nm from an Ar laser to polymerize the monomer to obtain a desired material. Finally, the material was subjected to heat treatment at 160° C. Such a heat treatment at a temperature of 150° C. or higher can valtalize an organic solvent or water added as a catalyst during production process so as to prevent the organic solvent and water from remaining in the material. Accordingly, this heat treatment can suppress material shrinkage caused by the volatilization of the organic solvent and water after element formation, and reduce temperature change of optical element.

Figure 2:
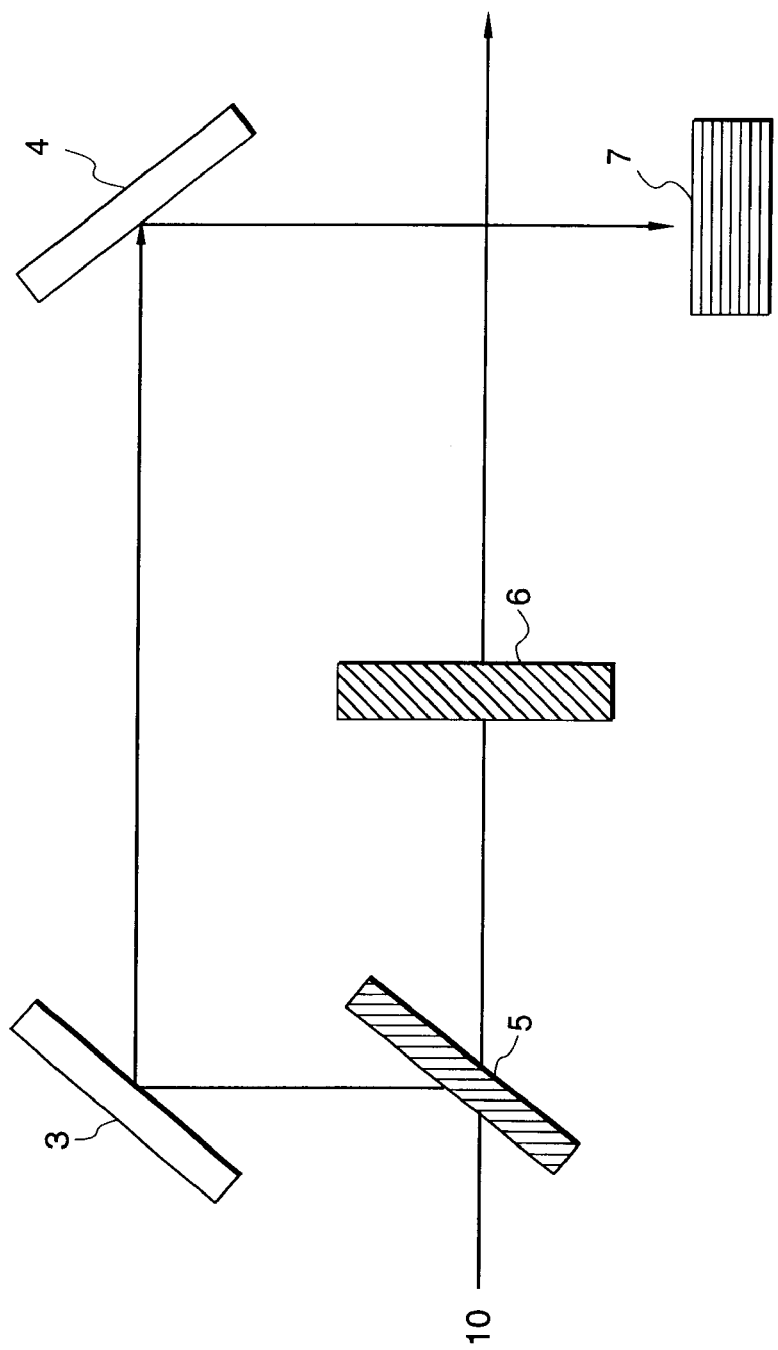
FIG. 2 is an interference optical system for measuring optical path length changes.
Figure 3:
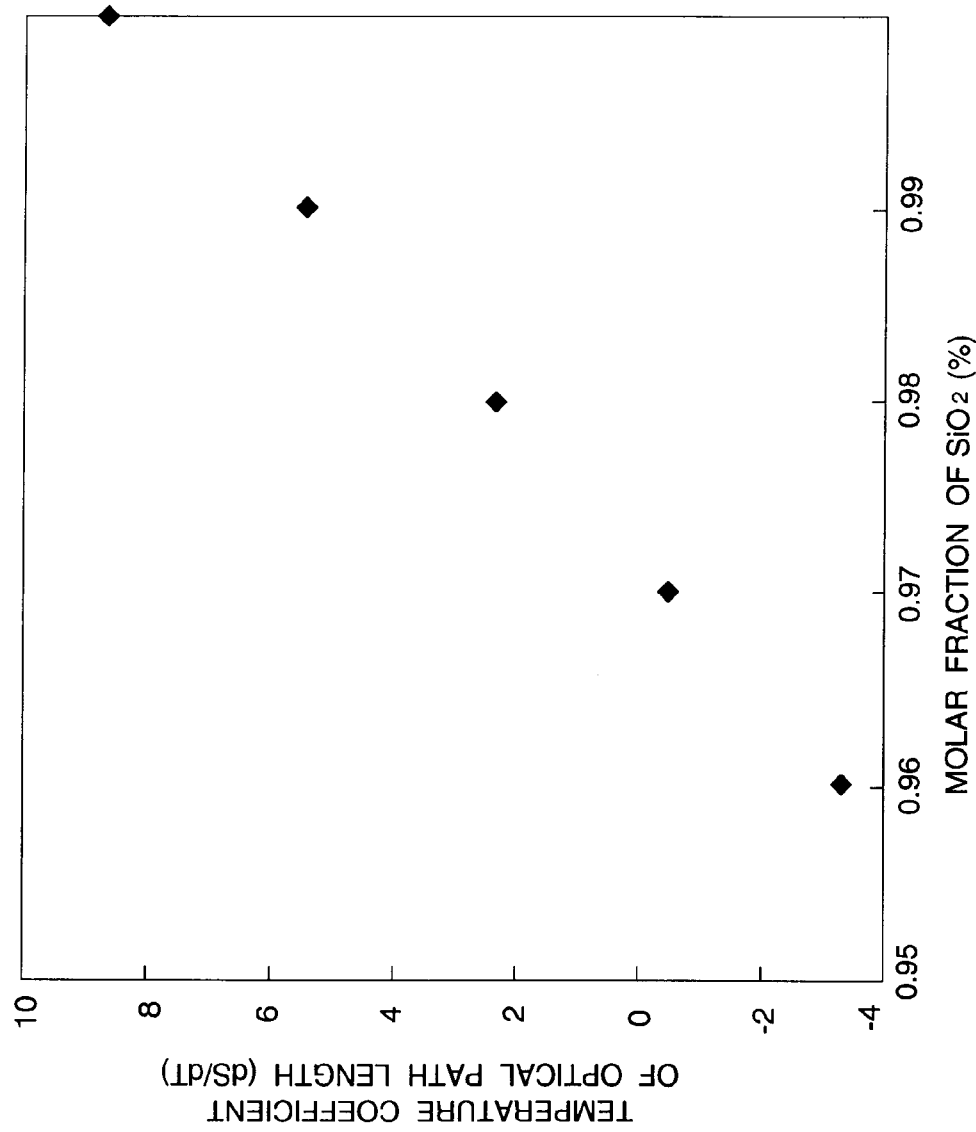
FIG. 3 is a graph showing the relationship between the temperature dependence of optical path length and the composition as obtained by experimentation with an interferometer.
Figure 4:
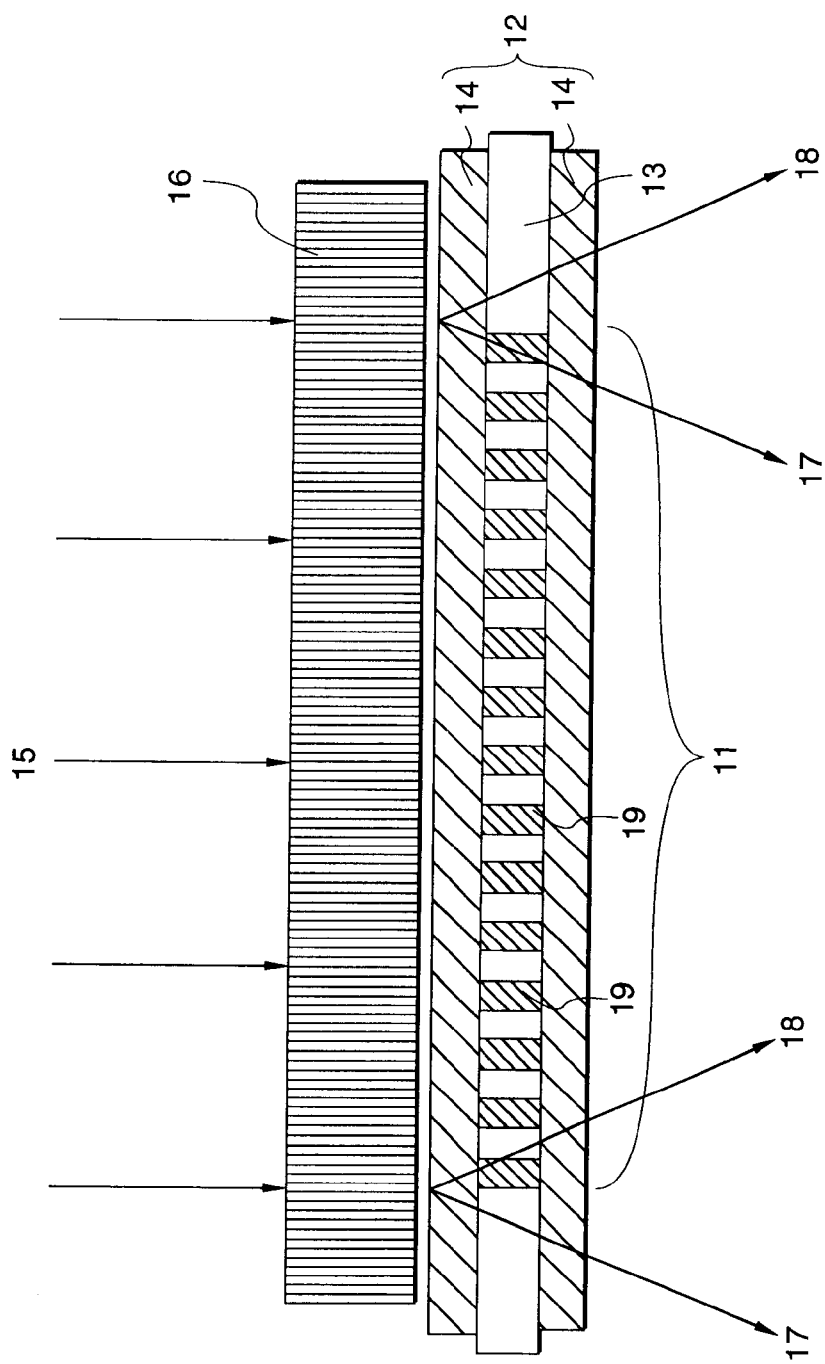
FIG. 4 shows the structure of an optical fiber Bragg diffraction grating and a method of preparing the same.

As illustrated in FIG. 2, the resulting material having a thickness of 150 μm was set as a test sample 6 in a Mach-Zehnder interferometer comprising a half mirror 5, a first mirror 3, a second mirror 4, and an optical detector 7, and the test sample 6 was heated from room temperature up to 60° C. with a Peltier device (not shown). Incident light 10 was led through the interferometer, and the change in output light with a temperature rise was measured with the optical detector 7 to calculate a temperature coefficient of optical path length. The results obtained are shown in FIG. 3, from which it is seen that equation 1 or 5 is satisfied where the organic component molar percentage ranges from 2 to 10%. In FIG. 3, the vertical axis denotes a temperature coefficient of optical path length (dS/dT), and the horizontal axis denotes the molar fraction (mol %) of $SiO_2$.

While in Example 1, the material was applied to an interferometer only for the purpose of evaluating the optical path length change but not for limiting the application of the material. It should therefore be understood that the results obtained are to demonstrate that the material of the present invention is basically applicable to preparation of prisms, lenses and the like optical elements to produce similar effects.

As described above, the present invention discloses a material useful for constituting an optical system in which an optical path length participates. Optical characteristics of the optical elements using the material of the invention, such as prisms, lenses, and diffraction gratings, are independent of temperature. Therefore, the optical elements of the invention have high reliability with no need to prepare a system for temperature compensation. While in Example 1 a photosensitive polymer was used as an organic component, the organic material which can be used in the invention is not limited thereto.

EXAMPLE 2

Samples including $SiO_2$ as an inorganic material and a photopolymerizable monomer as an organic material were prepared. A reaction based chiefly on a sol-gel process was utilized for obtaining a uniform mixture of these materials. The starting materials were tetraethoxysilane (hereinafter abbreviated as TEOS) which supplies $SiO_2$ having a refractive index of about 1.42 and 2-hydroxy-3-phenoxypropyl acrylate ($CH_2$=$CHCOOCH_2C(OH)HCHO$—$C_6H_5$, hereinafter abbreviated as HFPA) as a photopolymerizable monomer. The ratio of the organic component and the inorganic component was obtained from the weight ratio of $SiO_2$ (after hydrolysis of TEOS) to HFPA and the polymerization initiator and the sensitizer used.

In Example 2, the molar ratio of the inorganic component was varied from 10% to approximately 90% to examine the effect. If the inorganic component exceeds 90 mol % (if the organic component is less than 10 mol %), the mixture does not exhibit sufficient photosensitivity for optical recording because of shortage of the photopolymerizable monomer. If the inorganic component is less than 10 mol % (if the organic component exceeds 90 mol %), the material easily undergoes plastic deformation, making it difficult to add optical processing to the edges, etc, or the material has poor weatherability. From this standpoint, the molar ratio of the organic component is desirably 50 mol % or less.

A waveguide structure was prepared as follows. A mixture consisting of 90 g of TEOS, 20 cc of tetrahydrofuran, 100 cc of isopropyl alcohol, 15.6 cc of water, and 7.2 cc of hydrogen chloride was allowed to react at 80° C. for 30 minutes to prepare a TEOS reaction mixture which was the base of an inorganic material. A prescribed amount of HFPA was added to the reaction mixture. Then 3,3',4,4'-tetra(t-butylperoxycarbonyl)benzophenone (BTTB, available from Nippon Oil & Fats Co., Ltd.) as a photopolymerization initiator and 3,3-carbonylbis(7-diethylaminocoumarin) (ketocoumarin dye) as a visible light photosensitizer were mixed therein in amounts of 10% by weight and 0.5% by weight, respectively, based on the solid content. The reaction mixture was applied to a quartz glass substrate by spin coating to obtain a film having a thickness of 2.5 μm.

Figure 5:
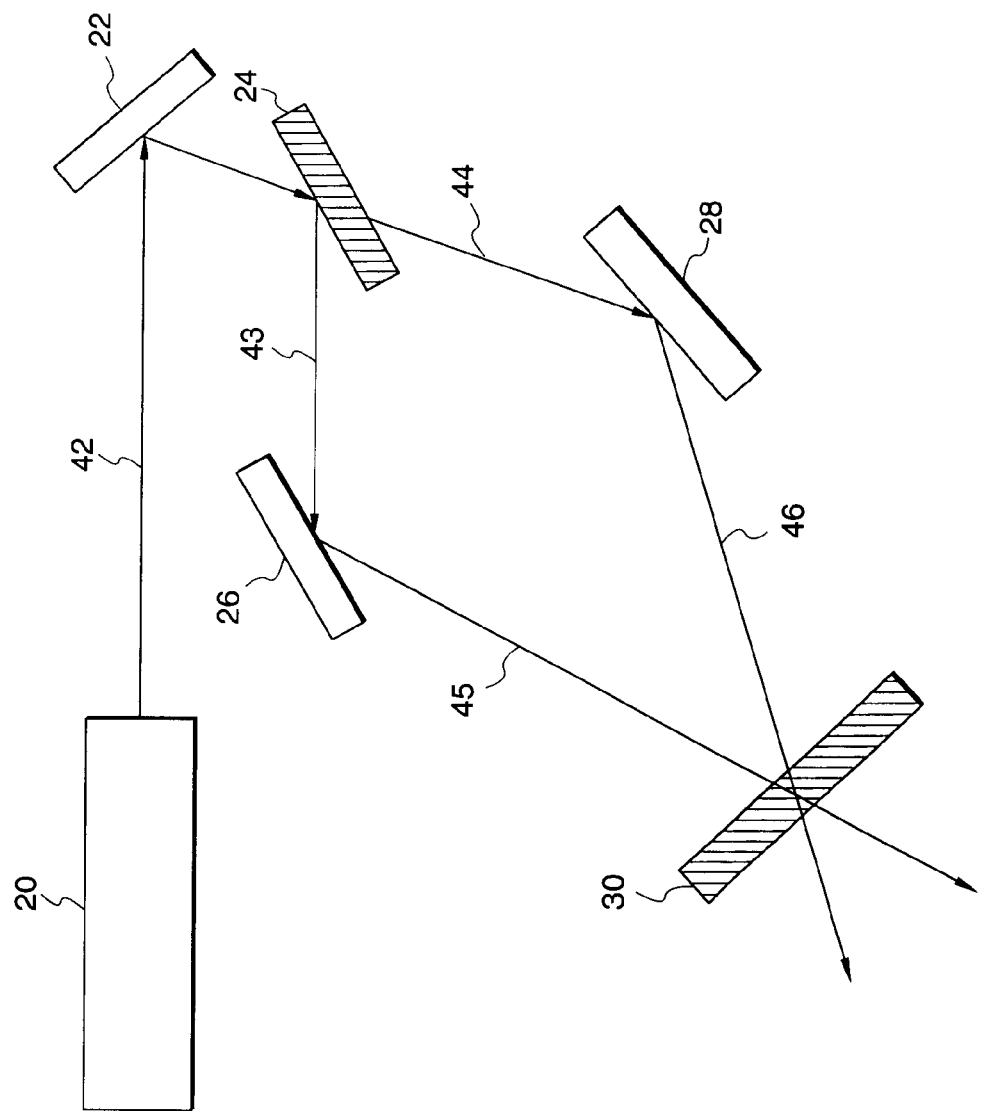
FIG. 5 shows an optical arrangement for two-beam interference exposure used in the preparation of the diffraction grating.

The photopolymerizable monomer in the resulting material (film) is capable of polymerization upon being irradiated with interference light having a strong intensity. The material was exposed to light of an He-Cd laser (wavelength: 325 nm) by a two-beam interference exposure method to form a diffraction grating having a period of 432 nm. The optical arrangement for the two-beam interference exposure method is shown in FIG. 5. Laser light 42 emitted from a laser 20 is reflected on a mirror 22 and divided into two beams 43 and 44 by a beam splitter 24. The beams 43 and 44 are reflected on mirrors 26 and 28, respectively, and the reflected beams 45 and 46 are allowed to interfere with each other on a sample 30 comprising the above-prepared thin film to irradiate the sample with light having a periodic intensity. Polymerization proceeded in the exposed areas to increase the refractive index thereby forming a diffraction grating having the refractive index changing periodically. The interference exposure conditions were set according to equation: $2\Lambda \cdot \sin\theta = \lambda$ ($\lambda$: wavelength of light; $\Lambda$: pitch of interference fringe; $\theta$: angle of interference exposure), in which $\theta$ was 22.1°.

Figure 6:
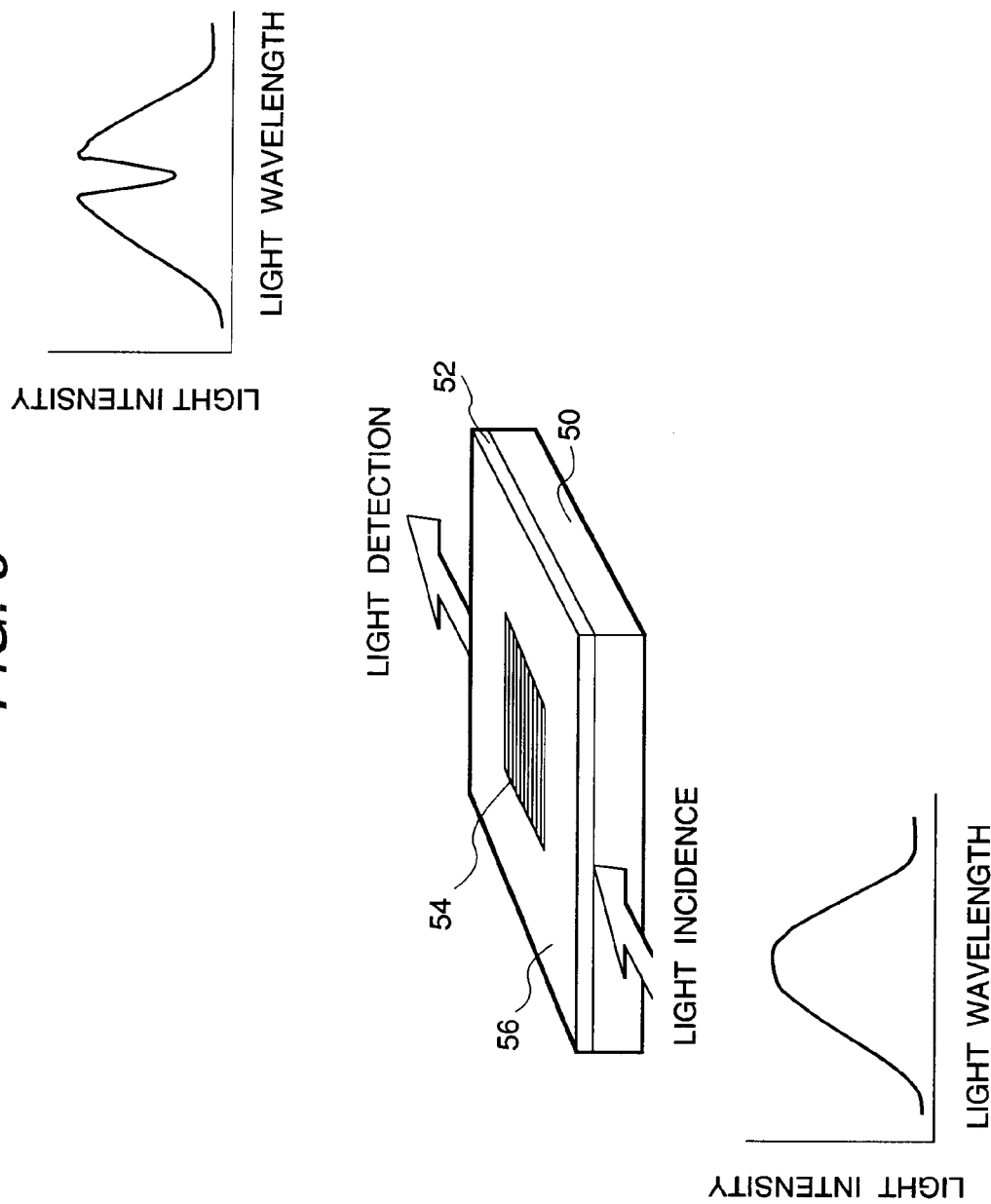
FIG. 6 is a perspective view of the diffraction grating of optical waveguide type prepared in Example 2.

As a result, a diffraction grating 54 was formed in part of the thin film 52 on the substrate 50 as shown in FIG. 6. The diffraction grating 54 formed by the exposure at the above angle had a pitch of 432 nm. Since the thin film 52 functioned as a slab waveguide 56, it guided light entering (incidence) from its edge as shown in FIG. 6. Finally, the material was subjected to heat treatment at 160° C. Such a heat treatment at a temperature of 150° C. or higher can valtalize an organic solvent or water added as a catalyst during production process so as to prevent the organic solvent and water from remaining in the material. Accordingly, this heat treatment can suppress material shrinkage caused by the volatilization of the organic solvent and water after element formation, and reduce temperature change of optical element. The light source was an LED having a wavelength peak at 1280 nm with a spectral band width of about ±100 nm.

The sample containing about 16 mol % of the organic component had a refractive index of 1.50. Analysis of the transmitted light under an optical spectrum analyzer revealed spectrum missing at 1280 nm as shown in FIG. 6, which was ascribed to the reflection of the Bragg grating. The diffraction wavelength of the diffraction grating, while varying depending on the refractive index of the sample, was within the above-mentioned wide spectrum band. When observed through an infrared vidicon camera, the waveguide pattern of the part of the slab waveguide 56 where the diffraction grating was not formed showed containment of light in the thickness direction, proving that the propagation mode in the thickness direction was a single mode. Where incident light is perpendicular to the grating, the diffracted light agrees with equation (1').

Figure 7:
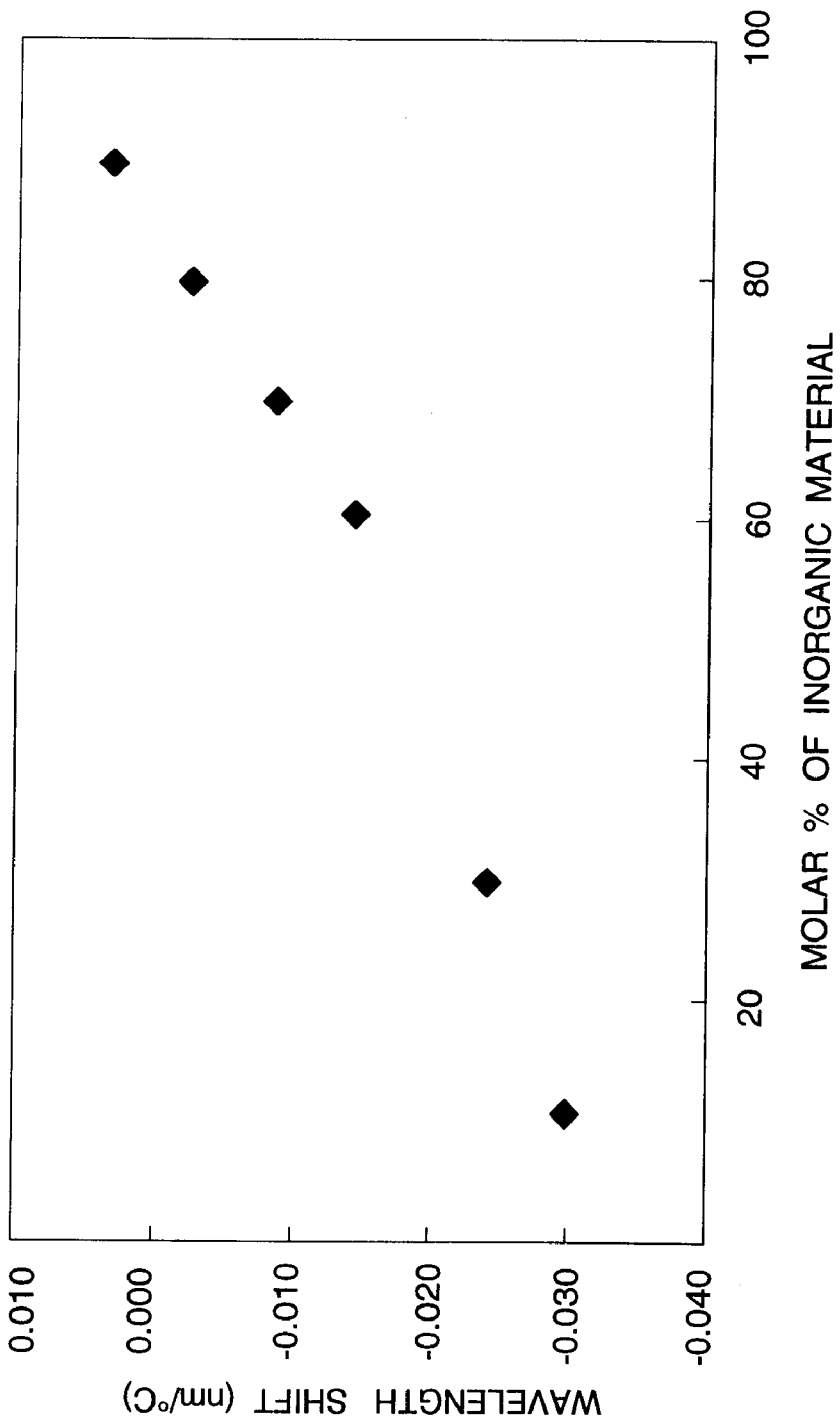
FIG. 7 is a graph showing the relationship between the ratio of an inorganic material and a wavelength shift.
Figure 8:
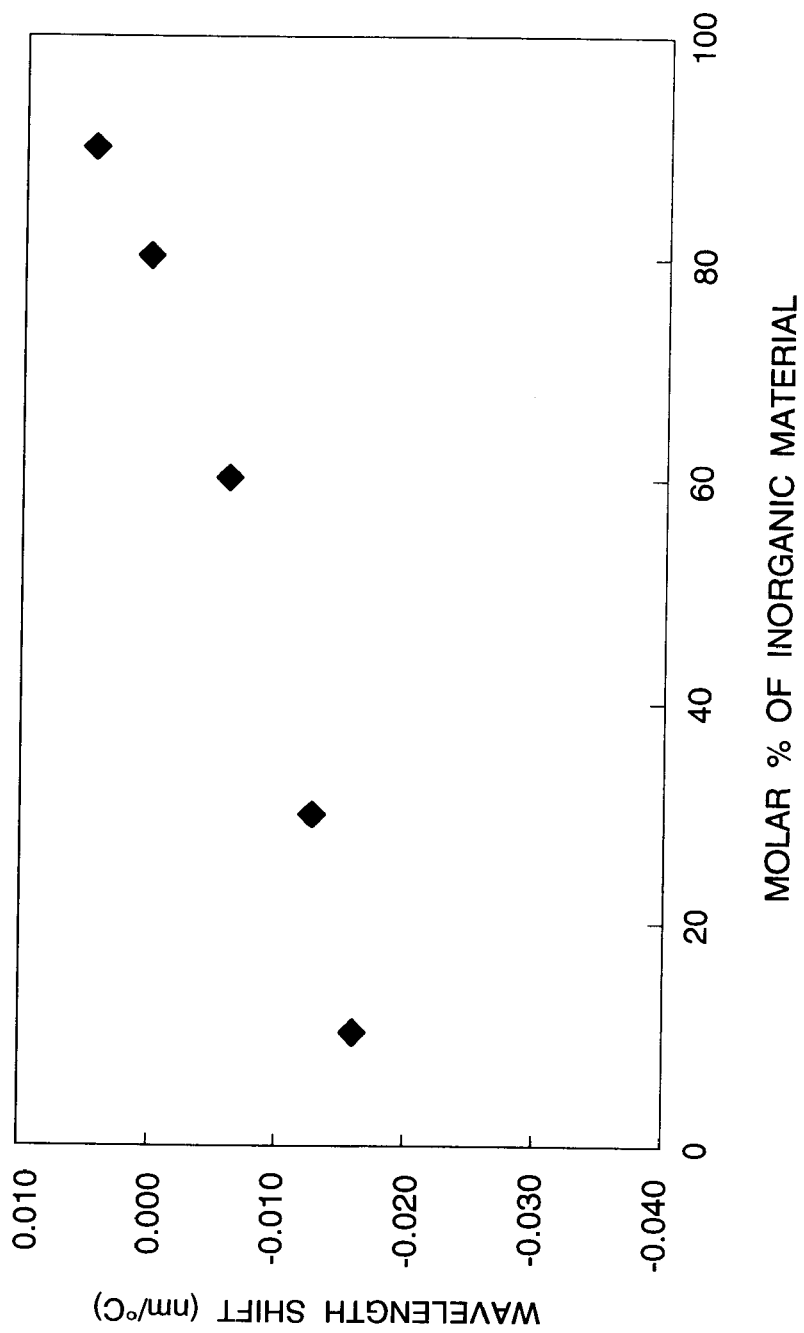
FIG. 8 is a graph showing the relationship between the ratio of an inorganic material and a wavelength shift.
Numerical Reference Numeral References used in the figures are set forth below.

The temperature dependence of the diffraction characteristics of the samples was measured. The temperature of the samples was varied by use of a Peltier device having a temperature control function. As can be seen from the graph shown in FIG. 7, the wavelength shift caused by a temperature change is in the negative direction in samples having a high organic component content and in the positive direction in samples having a high inorganic component content. In either cases, the shifts were smaller than in samples including either component alone. It is seen that a composition having an organic component content of around 16 mol % undergoes no wavelength shift with temperature changes.

Measurement of various physical properties of the composition having an organic component content of 16 mol % verified that the material is in good agreement with the relationships represented by equations (7') to (11').

EXAMPLE 3

A diffraction grating was obtained in the same manner as in Example 2 except that methyl methacrylate was used in place of 2-hydroxy-3-phenoxypropyl acrylate was used, and subjected to measurement on temperature dependency of diffraction characteristics.

It is seen that a composition having an organic component content of around 20 mol % undergoes no wavelength shift with temperature changes, and satisfied the relationships represented by equations (7') to (11') well.

Comparative Example 1

An optical waveguide was prepared in the same manner as in Example 2, except for replacing TEOS as an $SiO_2$ source with 30 g of polymethyl methacrylate and using 70 g of dioxane as a solvent. Twenty grams of HFPA were added, and BTTB (photopolymerization initiator) and the ketocoumarin dye were added in amounts of 10 wt % and 0.5 wt %, respectively, based on the solid content. The resulting film had a refractive index of 1.523. The material of Comparative Example 1 also undergoes polymerization on UV irradiation to provide a diffraction grating and the like. In order to obtain a single mode in the thickness direction, the film thickness was reduced to 2 $\mu$m because of its higher refractive index than that of Example 2. Because of the difference in refractive index from Example 2, the pitch of the diffraction grating was changed to 421 nm by altering the angle of exposure. The diffraction characteristics of the sample were measured in the same manner as in Example 2. While the reflection wavelength at 20° C. was 1280 nm, it apparently shifted to the higher energy side (shorter wavelength side) on being heated. The wavelength shift reached about 1.3 nm at 70° C.

In Example 2 and Comparative Example 1, Bragg diffraction gratings of optical waveguide type having the structure shown in FIG. 6 were prepared to demonstrate the effect of the present invention, but it should be noted that preparation of such an optical element is not the subject matter of the present invention. What is important is that the influence of thermal expansion and the influence of temperature-induced refractive index change can be offset by the material of the invention as shown in Example 2. The materials having such characteristics are suited as a material for making interference filters, photonic crystals, etalons, optical waveguides, etc. as well as diffraction gratings.

The organic materials which can be used in the invention are not particularly limited and include all known carbon compounds except carbon oxides and metal carbonates. That is, organic compounds made up mainly of hydrocarbon type carbon, hydrogen, nitrogen, sulfur, phosphorus, halogen atoms, etc. can be used. Photopolymerizable monomers can be used in preparing a diffraction grating having a periodic structure on the order of wavelength or in making use of interference of light. In this case, the material can contain a radical-generating photopolymerization initiator. A sensitizing dye, etc. can also be added in conformity with the wavelength of incident light.

The inorganic materials which can be used in the invention preferably include, but are not limited to, $SiO_2$-based glass materials. In addition, other glass materials mainly comprising $TiO_2$, $GeO_2$, $Al_2O_3$, $ZrO_2$, $B_2O_3$, $Na_2O$, MgO, CaO, etc. or mixtures thereof are also useful.

The materials according to the invention are conveniently prepared by a sol-gel process. Mere mixing of raw materials will also do. The importance resides in the ratio of the organic material and the inorganic material.

The relationship represented by equation (11') can apply to the material of the substrate. The invention enjoys broad applications and wide selection of materials.

The material of the invention makes it possible to produce diffraction optical devices, optical devices utilizing interference, etalons, etc. whose optical path length is free from the influence of temperature. Therefore, the optical elements of the invention exhibit extremely stable characteristics against temperature change without requiring to separately prepare a system for temperature compensation.

We claim:

1. An optical element comprising a solid material in an optical path of the optical element, wherein the solid material comprises at least one of a mixture of a first material and a second material and a composite of the first and second materials, the first material is an organic material and the second material is an inorganic material, and the first and second materials have first and second temperature coefficients of refractive index, respectively, wherein the first temperature coefficient of refractive index has a sign which is opposite that of the second temperature coefficient of refractive index.

2. The optical element according to claim 1, which further comprises a space comprising one of air and a vacuum in the optical path thereof.

3. The optical element according to claim 2, wherein the organic material is present in an amount of 2 to 10 mol % based on the mixture or the composite.

4. The optical element according to claim 2, which is a medium for a laser, a lens, a prism or a beam splitter.

5. The optical element according to claim 1, which consists essentially of the solid material.

6. The optical element according to claim 1, wherein the organic material comprises at least one of a hydrocarbon and a hydrocarbon derivative.

7. The optical element according to claim 6, wherein the inorganic material is a glass material comprising at least one of $SiO_2$, $TiO_2$, $GeO_2$, $Al_2O_3$, $ZrO_2$, $B_2O_3$, $Na_2O$, MgO, and CaO.

8. The optical element according to claim 1, which is a diffraction grating, an interference filter, a photonic crystal, an etalon or an optical waveguide.

9. The optical element according to claim 1, which is produced by a process including a heat treatment at 150° C. or higher.

* * * * *